United States Patent
Torzhkov et al.

(10) Patent No.: US 8,396,572 B2
(45) Date of Patent: Mar. 12, 2013

(54) SYSTEM AND METHOD FOR ENERGY PLANT OPTIMIZATION USING MIXED INTEGER-LINEAR PROGRAMMING

(75) Inventors: Andrey Torzhkov, Jersey City, NJ (US); Amit Chakraborty, East Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 546 days.

(21) Appl. No.: 12/691,909

(22) Filed: Jan. 22, 2010

(65) Prior Publication Data
US 2011/0066258 A1 Mar. 17, 2011

Related U.S. Application Data

(60) Provisional application No. 61/241,582, filed on Sep. 11, 2009, provisional application No. 61/241,597, filed on Sep. 11, 2009.

(51) Int. Cl.
*G05B 13/02* (2006.01)
(52) U.S. Cl. .......................................... 700/29; 700/31
(58) Field of Classification Search .............. 700/29–31, 700/286, 33, 34; 703/6, 18
See application file for complete search history.

(56) References Cited

U.S. PATENT DOCUMENTS

| | | | |
|---|---|---|---|
| 2005/0192680 A1* | 9/2005 | Cascia et al. | 700/29 |
| 2007/0168174 A1* | 7/2007 | Davari et al. | 703/18 |
| 2009/0043406 A1* | 2/2009 | Gauder et al. | 700/30 |

* cited by examiner

*Primary Examiner* — Jeffrey A Gaffin
*Assistant Examiner* — Steven Garland

(57) ABSTRACT

A method for optimizing operational settings for a plurality of energy devices includes representing each of the plurality of energy devices in terms of a set of decision variables and operational parameters. The decision variables and operational parameters are constrained based on operational conditions and interrelationship within the plurality of energy devices. A two-tiered model of the plurality of energy devices is generated wherein a top tier of the model represents interaction of various sub-models and a bottom tier of the model includes a set of the sub-models that form the top tier, each sub-model representing detailed operation of the plurality of energy devices. The two-tiered model is optimized to provide either a schedule of operation for the plurality of energy devices or real-time control for the plurality of energy devices.

18 Claims, 8 Drawing Sheets

SYSTEM AND METHOD FOR ENERGY PLANT OPTIMIZATION USING MIXED INTEGER-LINEAR PROGRAMMING

CROSS-REFERENCE TO RELATED APPLICATION

The present application is based on Provisional Application Ser. No. 61/241,582, filed Sep. 11, 2009 and Provisional Application Ser. No. 61/241,597, filed Sep. 11, 2009, each of which are herein incorporated by reference in their entirety.

BACKGROUND OF THE INVENTION

1. Technical Field

The present disclosure relates to energy plant optimization and, more specifically, to a system and method for energy plant optimization using mixed integer-linear programming.

2. Discussion of Related Art

Large-scale commercial buildings such as skyscrapers and industrial buildings such as factories have large and complex energy generation and utilization needs. These needs include chilled water, chilled air, hot water, hot air, electrical loads, and the like. To meet these complex energy generation and utilization needs, these buildings, referred to herein as energy plants or simply plants, may include a large number of devices that utilize energy, generate energy, and/or store energy, for example, to provide for the plant's heating, cooling and electricity needs. These devices are referred to herein as energy devices and include devices that utilize energy such as water chillers, air conditioners, water heaters, and devices that utilize plant electricity. Energy devices may also include devices that generate energy such as fossil fuel-powered electrical generators, geothermal systems, solar collectors and photovoltaic cells. Energy devices may also include devices that store energy for later use such as thermal energy storage devices, batteries and the like.

Conventionally, energy systems may be activated and deactivated as needed. For example, a water chiller may activate when there is a need for chilled water and an air conditioner may activate when there is a need for cool air. However, as a plant may include a great number of energy devices, it is possible and in fact probable that many such devices expend energy to work against each other and operate in a less than ideal fashion.

Suboptimal plant energy generation, storage and usage may lead to excessive costs, unnecessarily large environmental impact, overtaxing of energy grids, and difficulty in complying with present and proposed governmental regulations.

SUMMARY

A method for optimizing operational settings for a plurality of energy devices includes representing each of the plurality of energy devices in terms of a set of decision variables and operational parameters. The decision variables and operational parameters are constrained based on operational conditions and interrelationship within the plurality of energy devices. A two-tiered model of the plurality of energy devices is generated wherein a top tier of the model represents interaction of various sub-models and a bottom tier of the model includes a set of the sub-models that form the top tier, each sub-model representing detailed operation of the plurality of energy devices. The two-tiered model is optimized to provide either a schedule of operation for the plurality of energy devices or real-time control for the plurality of energy devices.

The plurality of energy devices may include a sub-grouping of chiller units, a sub-grouping of heater units and an air handling device, each with a corresponding sub-model within the two-tiered model of the plurality of energy devices. The sub-grouping of heater units may include one or more boilers and a feedwater tank. The sub-grouping of cooling units may include one or more centrifugal chillers and a cooling tower.

Optimizing the two-tiered model may be performed using mixed integer-linear programming. Optimizing the two-tiered model may include optimizing the top tier model and optimizing the bottom tier model iteratively.

The step of generating the two-tiered model may include representing the plurality of energy devices as a graph having a plurality of nodes that represent the sub-models of energy devices, utility sources, or ambient conditions and a plurality of edges that interconnect the nodes, each edge setting forth an operational relationship between the sub-models connected by the corresponding edges.

With respect to the top tier of the two-tiered model, each sub-model may be treated as a gray box model and with respect to the bottom tier of the two-tiered model, each sub-model includes a detailed representation of the energy devices of that sub-model.

Optimizing the two-tiered model may be performed using an optimization solver. Alternatively, or additionally, optimization of the two-tiered model may provide a schedule of operation for the plurality of energy devices, dictating activation times, deactivation times or operational levels of the plurality of energy devices. Alternatively, or additionally, optimization of the two-tiered model may provide real-time control of the plurality of energy devices, controlling activation times, deactivation times or operational levels of the plurality of energy devices.

The plurality of energy devices may include devices that utilize energy, devices that generate energy, and/or devices that store energy.

A computer system includes a processor and a program storage device readable by the computer system, embodying a program of instructions executable by the processor to perform method steps for optimizing operational settings for a plurality of energy devices. The method includes generating a model of the plurality of energy devices representing interaction of the energy devices with each other and operational variables and optimizing the model to provide either a schedule of operation for the plurality of energy devices or real-time control for the plurality of energy devices.

Each of the plurality of energy devices may be represented in the model in terms of a set of decision variables and operational parameters. The model may be a two-tiered model in which the energy devices are organized into sub-groupings and the interaction between each of the sub-groupings is represented at a top tier of the model and the interaction between each of the energy devices within each sub-grouping are represented at a bottom tier of the model.

Optimization of the model may be performed using mixed integer-linear programming.

A computer system includes a processor and a program storage device readable by the computer system, embodying a program of instructions executable by the processor to perform method steps for optimizing operational settings for a plurality of energy devices. The method includes representing each of the plurality of energy devices in terms of a set of decision variables and operational parameters, constraining the decision variables and operational parameters based on operational conditions and interrelationship between the plurality of energy devices, generating a two-tiered model of the plurality of energy devices wherein a top tier of the model represents interaction of various sub-models and a bottom tier of the model includes a set of the sub-models that form the top tier, each sub-model representing detailed operation of the plurality of energy devices, and optimizing the two-tiered model to provide either a schedule of operation for the plurality of energy devices or real-time control for the plurality of energy devices an optimization solver employing mixed integer-linear programming.

Generating the two-tiered model may include representing the plurality of energy devices as a graph having a plurality of nodes that represent the sub-models of energy devices, utility sources, or ambient conditions and a plurality of edges that interconnect the nodes, each edge setting forth an operational relationship between the sub-models connected by the corresponding edges.

With respect to the top tier of the two-tiered model, each sub-model may be treated as a gray box model and with respect to the bottom tier of the two-tiered model, each sub-model includes a detailed representation of the energy devices of that sub-model.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
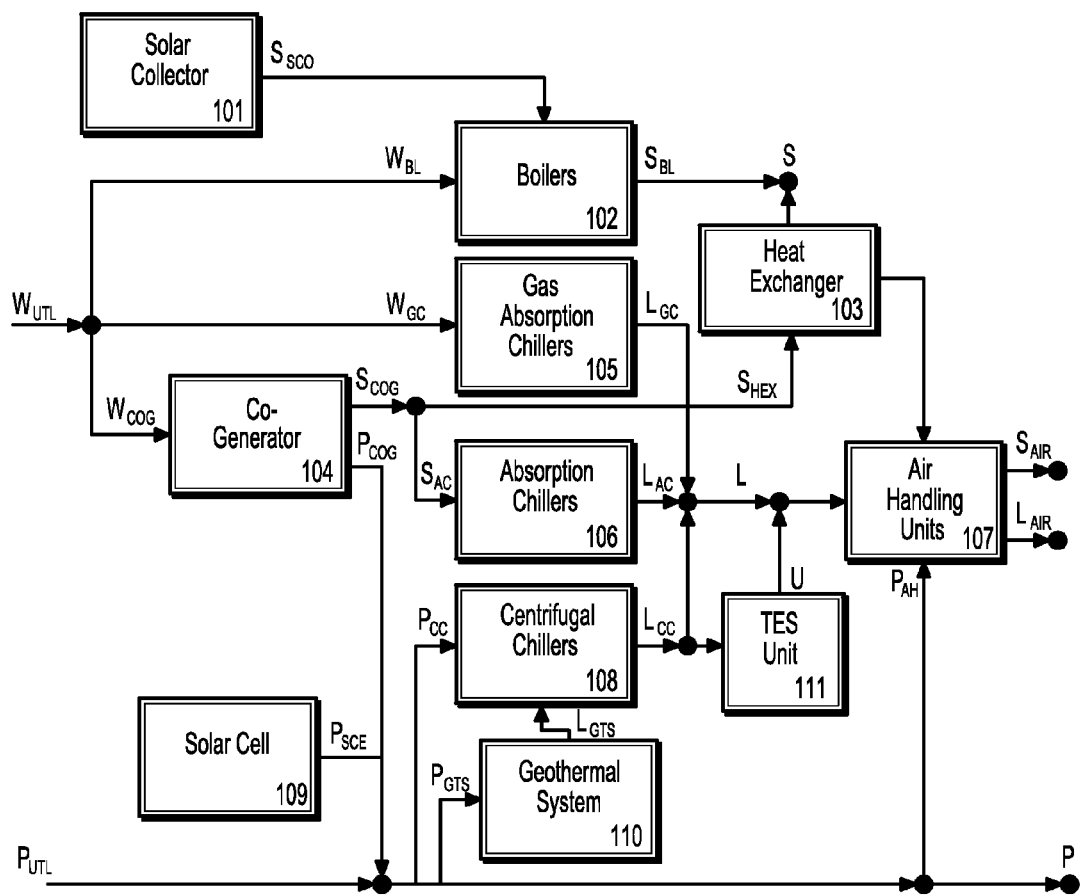
FIG. 1 is a schematic diagram illustrating a plant's power generation systems and water and air distribution systems according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a method and system for optimizing the energy needs of plants using automatic systems for analyzing the relationship between a large number of energy devices using mixed integer-linear programming. Optimization of energy needs may include, for example, minimizing total utility costs, minimizing total energy used, minimizing carbon footprint, or a combination of these and/or other optimization goals.

As discussed above, energy devices may be categorized as falling into one or more categories: (1) energy utilization devices that consume energy, (2) energy generation devices that produce energy, and (3) energy storage devices that store energy for later use. Examples of each of these categories of energy devices are provided above, however, exemplary embodiments of the present invention are versatile enough to handle any energy device, including those not yet available, provided that key operational parameters are known or knowable, as described in detail below. While energy devices may be diverse, exemplary embodiments of the present invention are described herein in terms of a limited number of devices for the purposes of simplicity.

Exemplary embodiments of the present invention seek to optimize energy devices by synchronizing their utilization and/or power settings in an orchestrated manner in a predictive and adaptive fashion. Accordingly, exemplary embodiments of the present invention may be used to produce an operating schedule for a potentially large number of energy devices such as boilers, chillers, co-generation, thermal storage, and/or other forms of equipment that may use, generate and/or store power in one form or another.

FIG. 1 is a schematic diagram illustrating a plant's power generation systems and water and air distribution systems according to an exemplary embodiment of the present invention. Here one co-generator 104 is shown. A co-generator is a generator that produces energy in multiple forms, for example, electricity and steam, from a fuel source such as oil or gas. As shown, water from a utility source ($W_{UTL}$) may be introduced to the plant, for example at a single source, where a portion thereof ($W_{COG}$) may be diverted to the co-generator 104 where it is used to produce both steam ($S_{COG}$) and power ($P_{COG}$). Power (P) may also be provided to the plant through other sources such as from a utility source ($P_{UTL}$) and/or a photovoltaic cell or solar cell 109 ($P_{SCE}$). Power from multiple sources may be made accessible for both driving the plant's electrical load and for powering the energy devices that require power. For example, power ($P_{CC}$) may be provided to centrifugal chillers 108 and power ($P_{GTS}$) may be provided to a geothermal system 110. The geothermal system 110 may be used to cool down plant water supply, such as water emerging from air conditioners, by pumping the water through a network of underground pipes. Thus the geothermal system 110 may use power ($P_{GTS}$) to provide chilled water ($L_{GTS}$) to the centrifugal chillers 108 thereby lessening the power required by the centrifugal chillers 108. As long as the power supplied to the geothermal system 110 ($P_{GTS}$) is less than the reduction of power sent to the centrifugal chillers 108 ($P_{CC}$) when the geothermal system 110 is activated, it would be beneficial to utilize the geothermal system 110. Because, depending on certain parameters, it may not always be beneficial to utilize the geothermal system 110, effective utilization of the geothermal system 110 is one element that may be optimized to maximize plant efficiency.

Steam from the co-generator 104 ($S_{COG}$) may be used to send steam ($S_{HEX}$) to a heat exchanger 103 where heat can be transferred for productive use such as to heat potable water or to provide hot air to air handling units 107 which may provide hot air ($S_{AIR}$) and chilled air ($L_{AIR}$) to the plant.

Steam from the co-generator 104 ($S_{COG}$) may also be used to send steam ($S_{AC}$) to absorption chillers 106 where it may be used to provide chilled water ($L_{AC}$) to the air handling unit 107 and other uses. Chilled water ($L_{CC}$) may also be generated by the centrifugal chillers 108. Chilled water ($L_{GC}$) may also be generated by absorption chillers 105 which may take water ($W_{GC}$) from the utility source ($W_{UTL}$). In this way, chilled water for serving the air handling units 107, as well as other plant purposes, may be generated from multiple sources. Exemplary embodiments of the present invention may intelligently select the optimal balance of chilled water from among the available sources to minimize total energy usage, total cost of operation or any other specified priority.

Boilers 102 may receive water ($W_{BL}$) from the utility source ($W_{UTL}$) and produce hot water ($S_{BL}$) for serving the air handling units 107, as well as other plant purposes. Accordingly, there may also be multiple sources of hot water and exemplary embodiments of the present invention may intelligently select the optimal balance of hot water from among the available sources to satisfy the specified priority. For example, the boiler 102 may heat water ($S_{SCO}$) within a solar collector 101 in which water is sent through dark colored pipes or tanks that are exposed to sunlight. As sunlight may not always be available and/or sufficient to meet the needs of the plant, exemplary embodiments of the present invention may intelligently control all hot water sources for optimal effect.

Various devices for storing energy in various forms may be used, for example, to provide greater efficiency by balancing out operation of energy producing devices so they may remain in optimal efficiency ranges for longer periods of time, and for pulling energy from utilities during off-peal periods of lower rates for use during peak periods of higher rates. One example of an energy storage device is a thermal energy storage (TES) unit 111 which may store chilled water ($L_{CC}$) or ice during off-peak periods to meet increased cooling requirements during peak periods.

Accordingly, as can be seen from FIG. 1 and the detailed description above, various energy devices of a plant may be highly interrelated and through intelligent management techniques, such as those described in detail herein, substantial reductions of cost, energy usage and environmental footprint may be achieved.

As used in the description above, and in the remainder of the specification, water is abbreviated W, electrical power is abbreviated P, steam is abbreviated S, and chilled fluid (such as water and air) is abbreviated L. Subscripts may be added to these abbreviations to designate source and/or destination such as SCO for solar collector, BL for boiler, GC for gas absorption chiller, HEX for heat exchanger, UTL, for utility source, COG for co-generator, AC for absorption chiller, AH for air handling units (input), AIR for air handling units (output), CC for centrifugal chillers, SCE for solar cell, and GTS for geothermal system.

Also as referred to herein, $\mu$ may be used to represent efficiency, for example, $\mu_{HEX}$ would represent the heat exchanger efficiency. The numbers of various energy devices may be expressed as l, m, n, o, and p for the numbers of boilers, absorption chillers, centrifugal chillers, gas-fired absorption chillers, and air handling units, respectively. Each energy device may be referred to herein as $BL_i$, $AC_i$, $CC_i$, $GC_i$, and $AH_i$ and their index sets may be expressed as $1, \ldots, l$, $1, \ldots, m$, $1, \ldots, n$, $1, \ldots, o$, and $1, \ldots, p$ to express the fact that there may be multiple instances of each energy device. For example, there may be multiple air handling units ($AH_1$ to $AH_p$) that may divide the plant into p different zones.

Additional energy devices may include "green components" such solar collectors (SCO), geothermal systems (GTS), and photo-voltaic solar cell (SCE). Energy devices such as these may be enumerated by an index set $\Omega$, however, the TES unit 111 and the heat exchanger 103 may be omitted from the index set.

As exemplary embodiments of the present invention may seek to schedule the operation of the energy devices, scheduling may be accomplished within units of time such as billing periods, which may be, for example, a say or a month. Each billing period may then be divided into N slices of time, each measured in a time unit $\Delta T$ which may be, for example, am hour. The time slices may be referred to herein as stages and may be indexed as $k-1, \ldots, N$. Accordingly, this notation may be used herein to establish a schedule and to consider the steady state condition of the system of energy devices.

Input variables such as rates charged for energy from utilities may factor into optimal scheduling, particularly where cost is a factor for optimization. Accordingly, these input variables may be expressed as $R_{GAS}$ for the rate of gas per unit and $R_{ELE}$ for the rate of electricity by unit. Rather than representing a particular fixed value, these input variables may be dependent upon peak and off-peak rate structures and other factors such as level of use, etc., all of which may be expressed. However, this value may also be expressed as a flattened real-time pricing (RTP) rate $R_{ELE}^k$ that may be constant over a particular time slot k.

These and other provided utilities may be used to satisfy three types of requirements: P, S, and L, which may represent electrical power, hot water, and chilled water loads, respectively. Hot and chilled water loads may be divided into p different sections that may be denoted as $S_{AIR-i}$ and $L_{AIR-i}$, which may represent hot and chilled air loads of zone i, where $i = 1, \ldots, p$. Exemplary embodiments of the present invention may avoid wasting energy by requiring that either $S_{AIR}$ or $L_{AIR}$ are set to zero ensuring that for a given zone, hot water and chilled water are not simultaneously sent through the air handling unit. Furthermore, as it may be assumed that these loads may be given based on different time slices, for example $S_{AIR-i}^k$ may be the hot air demand in stage k. Due to the steady-state assumption, for each stage, the input S and L may be equal to the sum of input $S_{AIR-i}$ and $L_{AIR-i}$, respectively. Moreover, solar intensity $I^k$ for each stage k may also be used for solar collector and solar cell, as solar intensity may dictate the availability of these particular resources. Even though time slices $\Delta T$ may be set to any convenient length of time, as described herein, $\Delta T = \frac{1}{3}$ hours, or 20 minutes. Accordingly, N=72 stages in a 24 hour billing period.

Thus, the following values may be known or predictable: hot air load $S_{AIR-i}$, chilled air load $L_{AIR-i}$, hot water load S, chilled water load L, electricity load P, solar intensity I and utility rates R. Additionally, operational limits for each energy device may be known, for example, as discussed in greater detail below.

Each energy device may have its own set of design/capacity constrains and/or other operational parameters. For example, the steam consumption of an absorption chiller may be constrained by both a minimum and maximum amount of input. These and other operational parameters may be known and available, for example, by the manufacturer of the corresponding energy device, or they may be experimentally determined. However, as described here, these bounding variables may be assumed to be known, and may be denoted by subscript des and may be scaled by $\alpha \epsilon [0,1]$, i.e.:

$$\alpha A C_i S^k_{ACi,des} \leq S^k_{ACi} \leq S^k_{ACi,des}$$

Additionally, each energy device involved in the optimization may have additional operational parameters such as proper minimum up-time (MUT) and down-time (MDT), as well as its own ramp-up and ramp-down times (i.e., warm-up time in order to achieve maximum performance and shutdown time). For example, MUT and MDT for an energy device may be less than 1.5 hours. There units, as operational parameters, may be assumed herein to be known beforehand, however, where not known, they may be experimentally determined.

In scheduling the operation of the active equipments $\Omega$, exemplary embodiments of the present invention may determine, for each time slot $k=1, \ldots, N$, whether an energy device $i \in \Omega$ should be activated or deactivated. In so doing, binary decision variables such as $\delta_i^k \in \{0,1\}$ (e.g., $\delta_{CC_i}^k = 1$ if the centrifugal chiller $CC_i$, $i \in 1, \ldots, n$ is activated at time k) may be employed.

Also, as referred to herein, $W_{UTL}^k$ and $P_{UTL}^k$ may denote the quantity of gas and electricity, respectively, purchased from the utility company at time k. As indicated above, the operating parameters of each energy device are assumed to be known and this may include, for example, the rate of power consumed. This information, as described in greater detail below, may be dependent on complex decision variables. For example, the power consumption of a chiller may be computed from the complex relation between its compressor with the pumps controlling the flows in the two water loops that are involved. Accordingly, these water flows may be determined in controlling the power consumption of the respective pumps together with the compressor itself.

Moreover, a quantity of thermal energy stored into or remove from the TES may be determined. Here, Let $ST^k$ may represent the thermal storage charge state at time k (measured in kWh). The amount of cooling energy (measured in kW) removed from/stored into the thermal energy storage system at time k may be represented as $U^k$.

Exemplary embodiments of the present invention may seek to determine the value of the following variables while minimizing the total utility cost: equipment scheduling variables $\delta_i$, $i \in \Omega$; amount of energy to remove/store into the TES ($ST^k$ and $U^k$); equipments' internal decision variables; and energy input/output of the equipments (for example, $W_{COG}$, $S_{COG}$, and $P_{COG}$; $S_{SCO}$; $P_{SCE}$; $P_{GTS}$ and $L_{GTS}$; $S_{AC\,i}$ and $L_{AC\,i}$; $P_{PC\,i}$ and $L_{CC\,i}$; $W_{GC\,i}$ and $L_{GC\,i}$; $W_{BL\,i}$ and $S_{BL\,i}$; $P_{AH\,i}$; $S_{HEX}$; $P_{UTL}$ and $W_{UTL}$). For the purposes of the description below, the model plant power systems of FIG. 1 will be referred to and the optimization model described herein may be formulated based on the exemplary plant of FIG. 1.

Exemplary embodiments of the present invention may utilize an optimization model that is appropriate to the conditions being optimized. For example, an optimization model for minimizing total utility costs may be utilized. Using the notation described above, such a model may take the form:

$$\sum_{k=1}^{N} [R_{gas} W_{UTL}^k + R_{ele}^k P_{UTL}^k] \quad (1)$$

Here, the following equality may be used:

$$W_{UTL}^k = \quad (2)$$
$$\delta_{COG}^k W_{COG}(S_{COG}^k, P_{COG}^k) + \sum_{i=1}^{l} \delta_{BL_i}^k W_{BL_i}(S_{BL_i}^k) + \sum_{i=1}^{o} \delta_{GC_i}^k W_{GC_i}(L_{GC_i}^k),$$

The equality of Equation 2 may represent the amount of gas used by the plant in time k. In these equations, the following input/output relations may be used:

$W_{COG}(S_{COG}^k, P_{COG}^k)$=amount of gas required by the cogenerator to produce $S_{COG}^k$ units of steam and $P_{COG}^k$ units of electricity.

$W_{BLi}(S_{BLi}^k)$ a amount of gas required by the boiler i to produce $S_{BLi}^k$ units of hot water.

$W_{GCi}(L_{GCi}^k)$=amount of gas required by the gas-fired absorption chiller i to produce $K_{GCi}^k$ units of chilled water.

Minimizing cost need not be the only objective function that may be used. Exemplary embodiments of the present invention may wish to lower the production of greenhouse gases by minimizing the use of fossil fuels. This objective function may be expressed as:

$$\sum_{k=1}^{N} W_{UTL}^k \quad (3)$$

It should be noted that where the optimization problem with objective function given by Eq. (1) can be solved, the problem with objective function given by Eq. (2) may also be solved, for example, by the same algorithm. Accordingly, for the purposes of simplicity of explanation, description herein may be limited to the use of Eq. (1).

Exemplary embodiments of the present invention may utilize constraints for the purposes of achieving the desired objective function. Constraints may include load requirements, thermal energy storage, and the operating parameters of the energy devices. Exemplary constraints are provided below, wherein these constraints are applicable for $1 \leq k \leq N$.

Determining the constraints may however begin with expressing a set of balancing equations for the plant:

$$L^k = \sum_{i=1}^{n} \delta_{CC_i}^k L_{CC_i}^k + \sum_{i=1}^{m} \delta_{AC_i}^k L_{AC_i}^k + \sum_{i=1}^{o} \delta_{GC_i}^k L_{GC_i}^k + \delta_{GTS} L_{GTS}^k - U^k \quad (4)$$

$$P^k = $$
$$P_{PUR}^k + \delta_{COG}^k P_{COG}^k + \delta_{SCE}^k P_{SCE}(I^k) - \delta_{GTS} P_{GTS}(L_{GTS}^k) - P_{CC}^k - P_{AH}^k$$

$$S^k = \eta_{HEX} S_{HEX}^k + S_{BL}^k + \delta_{SCO} S_{SCO}(I^k)$$

where $$S_{HEX}^k = \delta_{COG}^k S_{COG}^k - \sum_{i=1}^{m} \delta_{AC_i}^k S_{AC_i}^k (L_{AC_i}^k) \quad (5)$$

This balancing equation makes use of the following input/output relations, which are based on the model plant diagram of FIG. 1, however, input/output relations may be generated for any arbitrary plant configuration to create a set of balancing equations for that given plant:

$P_{SCE}(I^k)$≡an amount of electricity produced by the solar cells under solar intensity $I^k$.

$S_{SCO}(I^k)$≡an amount of hot water produced by the solar collector under solar intensity $I^k$.

$P_{GTS}(L_{GTS}^k)$≡an amount of electricity required by the geothermal system to produce $L_{GTS}^k$ of cooling load.

$S_{ACi}(L_{ACi}^k)$≡an amount of steam required by the absorption chiller i to produce $L_{ACi}^k$ units of cooling load.

$P_{CC}^k$≡amount of electricity required by the complete set of compressors and chillers at stage k.

$P_{AH}^k$≡an amount of electricity required by the complete set of air handling units at stage k.

$S_{BL}^k$ = an amount of hot water produced by the complete set of boilers at stage k.

$S_{HEX}^k$ = an amount of steam produced by the co-generator and then converted to hot water by the heat exchanger.

For the electrical-load balancing equation, it should be noted that the power consumption of the solar collector, solar cell, co-generator, boilers, gas absorption chillers, absorption chillers, heat exchanger, and TES unit may be intentionally neglected. These elements may optionally be left out of the balancing equation as their power consumption may be very small when compared with that of the chillers and air handling units. These terms could optionally be included in the balancing equations depending upon the particular optimization needs. This minor power consumption may also be taken into account, for example, by subtracting one or more additional terms from the right-hand side of the electrical load-balancing equation, such as $P_{BL}$ (the power consumed by the boilers), $P_{COG}$ (the power consumed by the co-generator), and so on.

The storage constraints may also be defined. In defining the storage constraints, the operating parameters of various energy devices may be related in comparable units. For example, energy storage $ST^k$ may be measured in kilowatt-hours while the storage access $U^k$, which may be the amount of cooling load removed from or stored into the TES, may be measured in kilowatts. Here, relation may be accomplished by dividing energy storage $ST^k$ by the time interval $\Delta T$. Thus the following constraints may be obtained:

$$ST^0 = 0 \quad (6)$$

$$\frac{ST^k}{\Delta T} = (1-\beta)\frac{ST^{k-1}}{\Delta T} + U^k$$

$$0 \leq ST^k \leq C_{ST}$$

$$-\frac{ST^{k-1}}{\Delta T} \leq U^k \leq \sum_{i=1}^{n} \delta_{CC_i}^k L_{CC_i}^k$$

Operational parameters for the energy devices may deviate from initial condition over time. For example, the efficiency of the thermal storage unit may depreciate as, for example, ice stored therein melts. Exemplary embodiments of the present invention may account for this change over time by utilizing a constraint that can model the changes. For example, a constraint $\beta \in [0,1]$ may be used to model the depreciation factor of the thermal storage system over time.

Bounds and binary decision variables for the energy devices of the plant may then be expressed for each time slot $k=1,\ldots,N$:

$$P_{UTL}^k \geq 0$$

$$W_{UTL}^k \geq 0$$

$$S_{HEX}^k \geq 0$$

$$\alpha_{COG} W_{COG,des}^k \leq W_{COG}^k \leq W_{COG,des}^k$$

$$\alpha_{GTH} P_{GTH,des}^k \leq P_{GTH}^k \leq P_{GTH,des}^k$$

$$\alpha_{AC_i} S_{AC_i,des}^k \leq S_{AC_i}^k \leq S_{AC_i,des}^k, i=1,\ldots,m$$

$$\alpha_{GC_i} W_{GC_i,des}^k \leq W_{GC_i}^k \leq W_{GC_i,des}^k, i=1,\ldots,o$$

$$\delta_i^k \in \{0,1\}, \forall i \in \Omega$$

$$UT_i \geq MUT_i, \forall i \in \Omega$$

$$DT_i \geq MDT_i, \forall i \in \Omega \quad (7)$$

It should be noted that each active component such as an energy device may be composed of several parts (e.g., pumps, coils, etc). Accordingly, a collection of equipment that together comprises a single energy device and/or multiple energy devices that work together may be described in terms of single units. When this is performed, additional constraints may be introduced, for example, as described in further detail below.

Exemplary embodiments of the present invention may account for a wide variety of energy devices both presently available and devices that may later be developed. As exemplary embodiments of the present invention may account for any form of energy device regardless of its particular parameters, the present invention should not be understood to be limited to the energy devices described herein. However, for the purposes of illustration, several different types of energy devices are described in detail below so that exemplary embodiments of the present invention may be better understood by reference to these devices.

Figure 2:
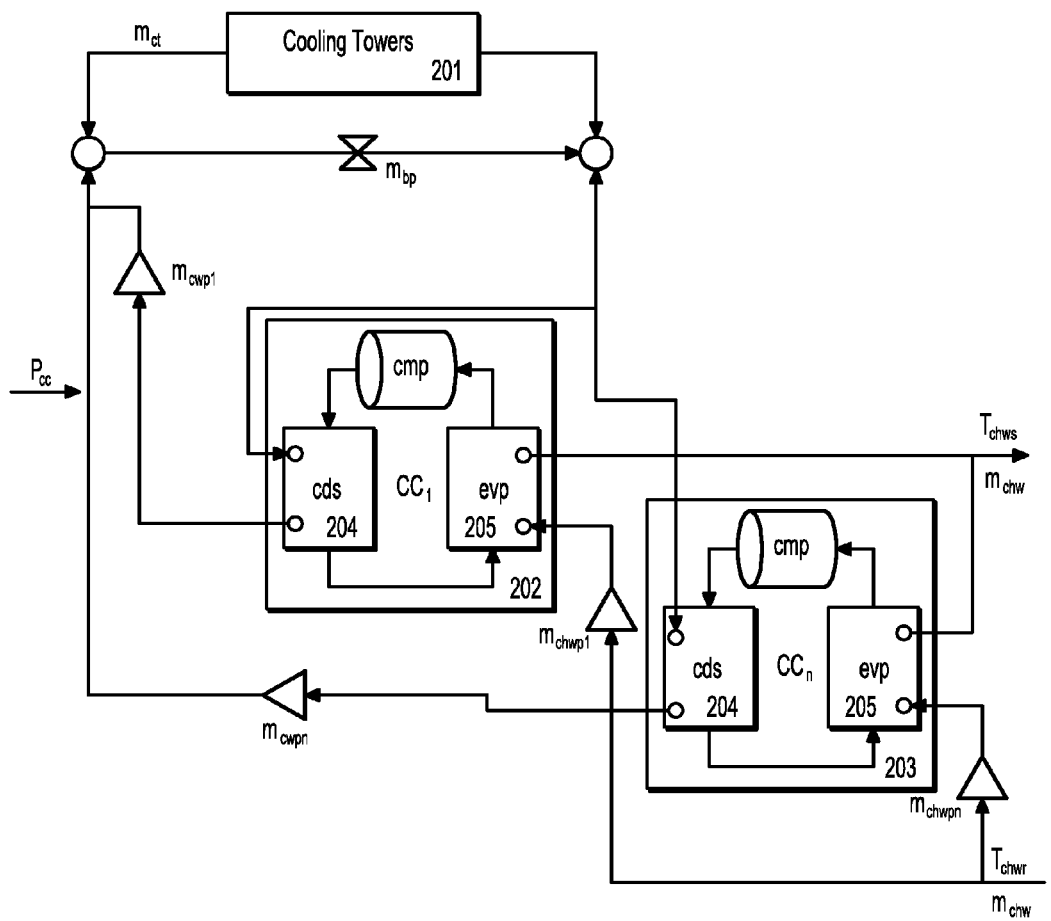
FIG. 2 is a schematic diagram illustrating a centrifugal chiller plant according to an exemplary embodiment of the present invention.

One form plant that may be optimized according to an exemplary embodiment of the present invention is the centrifugal chiller plant. FIG. 2 is a schematic diagram illustrating a centrifugal chiller plant according to an exemplary embodiment of the present invention. This device may utilize electricity to produce chilled water of a desired temperature. Exemplary embodiments of the present invention may thus be used to optimize power consumption within the plant.

The centrifugal chiller plant may include one or more cooling towers 201, one or more chillers (CC1) 202 through (CCn) 203 (which may each include a condenser (cds) 204, an evaporator (evp) 205), condenser water pumps ($m_{cwp1}$ through $m_{cwpn}$), chilled water pumps ($m_{chm1}$ through $m_{chwn}$), and air handling units (not shown). The condenser water pumps may be equipped with variable frequency drives, the chilled water pumps may be variable speed, and the air handling units may also be variable speed. Accordingly, each of these energy devices may be placed in an activated state or a deactivated state. When an energy device is in an activated state, its speed and/or drive frequency may be set. Each of these states and/or settings may be controlled/scheduled according to an optimal utilization plan that is generated according to exemplary embodiments of the present invention. As boilers and chillers may share air handlers, and since the need for cooling and heating varies with the season, air handlers are separately described in detail below.

In scheduling optimal utilization of the cooling plant in accordance with exemplary embodiments of the present invention, the following input variables may be used:

$n_{twr}$: number of cooling towers;

$m_{bp}$: water flow rate through the cooling tower bypass;

$h_{as}$: enthalpy of the air supplied by cooling tower fans at the current stage;

$T_{chwr}$: chilled water temperature leaving plant;

$(T_{chwr-i}-T_{chws-i})_{des}$: design value of the i-th chiller;

$m_{chwp-i,des}$: design mass flow rate of water pumped by the i-th chilled water pump;

$m_{cwp-i,des}$: design mass flow rate of water pumped by the i-th condenser water pump;

$m_{a,twr-i,des}$: design air flow through the i-th cooling tower;

$m_{w,twr-i,des}$: design mass flow through the i-th cooling tower;

$P_{chwp-i,des}$: design power of the i-th chilled water pump;

$P_{cwp-i,des}$: design power of the i-th condenser water pump;

$P_{twr-i,des}$: design power of the i-th cooling tower fan;

$Q_{evap-i,des}$: design evaporator load of the i-th chiller;

$c_{p,w}$: specific heat of water at constant pressure (k/lb·F):

$a_i, b_i, \ldots f_i$, and $k_i$: equipment-specific regression constants.

In scheduling optimal utilization of the cooling plant in accordance with exemplary embodiments of the present invention, the following decision variables may be determined by the optimization procedure:

$T_{cwr\text{-}i}$: condenser water temperature leaving i-th chiller;
$T_{chws\text{-}i}$: chilled water temperature leaving the i-th chiller;
$m_{chwp\text{-}i}$: mass flow rate in the chilled water loop of the i-th chiller;
$m_{w,twr\text{-}i}$: water flow rate through the i-th cooling tower.

In scheduling optimal utilization of the cooling plant in accordance with exemplary embodiments of the present invention, the following variables may depend on the decision variables returned by the optimization procedure:

$T_{chws}$: chilled water temperature entering the building;
$T_{cwr}$: condenser water temperature leaving the chiller plant;
$T_{cws}$: condenser water temperature entering the chiller plant;
$T_{twrr}$: water temperature entering the cooling tower system;
$T_{twrs}$: water temperature leaving the cooling tower system;
$T_{chwr\text{-}i}$: chiller water temperature entering the i-th chiller;
$T_{cws\text{-}i}$: condenser water temperature entering the i-th chiller;
$T_{twrr\text{-}i}$: water temperature entering the i-th cooling tower;
$T_{twrs\text{-}i}$: water temperature leaving the i-th cooling tower;
$h_{twrr\text{-}i}$: water enthalpy corresponding to $T_{twrr\text{-}i}$;
$\Delta T_{chw\text{-}i}$: difference between chilled water temperatures in the i-th chiller;
$\Delta T_{cw\text{-}i}$: difference between condenser water temperatures in the i-th chiller;
$\Delta T_{wr\text{-}i}$: difference between water temperatures in the i-th cooling tower;
$m_{chw}$: chilled water flow rate to the building;
$m_{cwp\text{-}i}$: condenser water flow rate in the i-th condenser water pump;
$m_{a,twr\text{-}i}$: air flow through the i-th cooling tower;
$w_{comp\text{-}i}$: work of compression produced by the i-th chiller;
$P_{cwp\text{-}i}$: power developed by the i-th condenser water pump;
$P_{twr\text{-}i}$: power developed by the i-th cooling tower fans;
$P_{comp\text{-}i}$: power of the i-th chiller compressor;
$L_{CC\text{-}i}$: cooling load produced by the i-th chiller;
$Q_{cond\text{-}i}$: condenser load of the i-th chiller;
$Q_{evap\text{-}i}$: evaporator load of the i-th chiller;
$Q_{a,twr\text{-}i}$: air-side heat transfer of the i-th chiller;
$v_{w,twr\text{-}i}$: water-side heat transfer of the i-th cooling tower;
$v_i$: refrigerant volumetric flow rate of the i-th chiller compressor;
$p_{d\text{-}i}$: refrigerant discharge pressure of the i-th chiller's compressor into the i-th condenser;
$p_{s\text{-}i}$: refrigerant discharge pressure of the i-th chiller's compressor in the i-th evaporator;
$\eta_{v\text{-}i}$: volumetric efficiency of the i-th chiller's compressor;
$\eta_{m\text{-}i}$: mechanical efficiency of the i-th chiller's compressor;
$CAPFT_i$: available capacity of the i-th chiller;
$EIRFT_i$: the full-load efficiency of the i-th chiller;
$EIRFPLR_i$: the efficiency of the i-th chiller;
$PLR_i$: the part-load operating ratio of the i-th chiller.

In scheduling optimal utilization of the cooling plant in accordance with exemplary embodiments of the present invention, constraints may be utilized to relate the decision variables, the input variables and the variables that depend on the decision variables. These constraints may be derived based on the limitations of the particular energy devices being used. Examples of constraints include constraints for the chilled water pumps:

$$Q_{evap_i} = c_{p,w} m_{chwp_i} \Delta T_{chw_i} \tag{8}$$

$$P_{chwp_i} = P_{chwp_i,des}\left(\frac{m_{chwp_i}}{m_{chwp_i,des}}\right)^3$$

$$\Delta T_{chw_i} = T_{chwr_i} - T_{chws_i}$$

Examples of constraints include constraints for the condenser water pumps:

$$Q_{cond_i} = c_{p,w} m_{cwp_i} \Delta T_{cw_i} \tag{9}$$

$$P_{cwp_i} = P_{cwp_i,des}\left(\frac{m_{cwp_i}}{m_{cwp_i,des}}\right)^3$$

$$\Delta T_{cw_i} = T_{cwr_i} - T_{cws_i}$$

$$T_{cws} = T_{cws_i}$$

$$T_{cwr} = \frac{\sum_{i=1}^{n} \delta_{CC_i} m_{cwp_i} T_{cwr_i}}{\sum_{i=1}^{n} \delta_{CC_i} m_{cwp_i}}$$

Examples of constraints include constraints for the cooling towers:

$$Q_{a,twr_i} = m_{a,twr_i}(h_{twrr_i} - h_{as}) \tag{10}$$

$$Q_{w,twr_i} = c_{p,w} m_{w,twr_i} \Delta T_{twr_i}$$

$$P_{twr_i} = P_{twr_i,des}\left(\frac{m_{a,twr_i}}{m_{a,twr_i,des}}\right)^3$$

$$\Delta T_{twr_i} = T_{twrr_i} - T_{twrs_i}$$

$$T_{twrr} = T_{twrr_i}$$

$$T_{twrs} = \frac{\sum_{i=1}^{n_{twr}} \delta_{CT_i} m_{w,twr_i} T_{twrs_i}}{\sum_{i=1}^{n_{twr}} \delta_{CT_i} m_{w,twr_i}}$$

All temperatures provided herein may express wet bulb temperatures. The relationship between water temperatures and water enthalpy may be assumed to be approximately linear and these linear relationships may be understood from within the related art. Polynomial regression may be used to find this relation. For example, within the temperature range of (19° C., 38° C.), the relationship between water temperature and water enthalpy may be:

$$h_{twrr\text{-}i} = 1.0531 T_{twrr\text{-}i} - 33.5275$$

Further, since the cooling tower bypass valve may be installed for maintenance, it may be assumed that $m_{bp}=0$. For the purpose of achieving a robust model, it may further be assumed that $m_{bp}$ is given, but not necessarily equal to 0. Here the following equations would result:

$$\sum_{i=1}^{n} \delta_{CC_i} m_{cwp_i} = m_{bp} + \sum_{i=1}^{n_{twr}} \delta_{CT_i} m_{w,twr_i} \quad (11)$$

$$T_{cws} = \frac{T_{twrr} m_{bp} + T_{twrs} \sum_{i=1}^{n_{twr}} \delta_{CT_i} m_{w,twr_i}}{\sum_{i=1}^{n} \delta_{CC_i} m_{cwp_i}}$$

$$T_{cwr} = T_{twrr}$$

Equations may then be produced for controlling the energy devices. For example, equations for controlling the chillers may start with:

$$w_{comp-i} = P_{comp-i}$$

Thus, a key equation for chillers is how to formulate $P_{comp-i}$, which may be equal to the power consumption of the i-th chiller. Equations for modeling power consumption of the chiller's compressor may be determined based on their design and manufacture, and may be, for example:

$$P_{comp_i} = \frac{v_i(p_{d_i} - p_{s_i})}{\eta_{v_i} \eta_{m_i}} \quad (12)$$

Although equation (12) may represent the physical ideal, exemplary embodiments of the present invention may seek to approximate as closely as possible a model for power consumption in such a way that the variables involved in the equation depend primarily and/or entirely on attributes of the compressor rather than on variables outside of the compressor. Accordingly, exemplary embodiments of the present invention seek to model power consumption based on the decision variables provided above. Accordingly, four alternative models for approximating $P_{comp-i}$ are presented below. These models include a linear model, a quadratic model, a simplified quadratic model, and a DOE2 mode.

The linear model may be:

$$P_{comp_i} = K_{ch_i} \Delta T_{chw_i} \quad (13)$$

The quadratic model may be:

$$x = \frac{Q_{evap_i}}{Q_{evap_i,des}} \quad (14)$$

$$y = \frac{T_{cwr_i} - T_{chws_i}}{(T_{cwr_i} - T_{chws_i})_{des}}$$

$$P_{comp_i} = P_{comp_i,des}(a_{0_i} + a_{1_i} x_i + a_{2_i} x_i^2 + a_{3_i} y_i + a_{4_i} y_i^2 + a_{5_i} x_i y_i)$$

The simplified quadratic model may be:

$$P_{comp_i} = b_{0_i} + b_{1_i} Q_{evap_i} + b_{2_i} Q_{evap_i}^2 + b_{3_i}(T_{cwr_i} - T_{chws_i}) + b_{4_i}(T_{cwr_i} - T_{chws_i})^2 + b_{5_i} Q_{evap_i}(T_{cwr_i} - T_{chws_i}) \quad (15)$$

The DOE2 model may be:

$$CAPFT_i = \quad (16)$$
$$d_{0_i} + d_{1_i} T_{chws_i} + d_{2_i} T_{chws_i}^2 + d_{3_i} T_{cws_i} + d_{4_i} T_{cws_i}^2 + d_{5_i} T_{chws_i} T_{cws_i}$$

$$EIRFT_i = e_{0_i} + e_{1_i} T_{chws_i} + e_{2_i} T_{chws_i}^2 +$$
$$e_{3_i} T_{cws_i} + e_{4_i} T_{cws_i}^2 + e_{5_i} T_{chws_i} T_{cws_i}$$

-continued
$$EIRFPLR_i = f_{0_i} + f_{1_i} PLR_i + f_{2_i} PLR_i^2$$

$$PLR_i = \frac{Q_{evap_i}}{Q_{evap_i,des} CAPFT_i}$$

$$P_{comp_i} = P_{comp_i,des} \cdot CAPFT_i \cdot EIRFT_i \cdot EIRFPLR_i$$

Herein, the coefficients a, b, . . . , f and k may be determined, for example, using regression that is based on historic performance data.

After the power consumption has been modeled, various balancing equations may be used as constraints. Exemplary balancing equations may include:

$$Q_{cond_i} Q_{evap_i} + w_{comp_i}, 1 \leq i \leq n$$

$$Q_{evap_i} = L_{CC_i}, 1 \leq i \leq n$$

$$Q_{a,twr_i} = Q_{w,twr_i}, 1 \leq i \leq n_{twr} \quad (17)$$

Additionally, capacity constraints such as the following may be used:

$$\alpha_{m_{chwp_i}} m_{chwp_i,des} \leq m_{chwp_i} \leq m_{chwp_i,des} \quad (18)$$
$$\alpha_{m_{cwp_i}} m_{cwp_i,des} \leq m_{cwp_i} \leq m_{cwp_i,des}$$
$$\alpha_{m_{a,twr_i}} m_{a,twr_i,des} \leq m_{a,twr_i} \leq m_{a,twr_i,des}$$
$$\alpha_{m_{w,twr_i}} m_{w,twr_i,des} \leq m_{w,twr_i} \leq m_{w,twr_i,des}$$
$$\alpha_{Q_{evap_i}} Q_{evap_i,des} \leq Q_{evap_i} \leq Q_{evap_i,des}$$
$$\alpha_{T_{cwr_i}-T_{chws_i}}(T_{cwr_i} - T_{chws_i})_{des} \leq T_{cwr_i} - T_{chws_i} \leq (T_{cwr_i} - T_{chws_i})_{des}$$

Often times a plant and/or building may utilize more than one of the same type of energy device. For example, a building may have multiple chillers. These chillers may be connected in parallel, however, it may also be possible to connect multiple chillers serially or in a composite connection that utilizes both serial and parallel connections. Accordingly, exemplary embodiments of the present invention may be flexible enough to accommodate multiple instances of chillers or some other form of energy device, with either parallel or composite connections. In so doing, the interaction between connected iterations of comparable equipment may be understood.

FIG. 2, as discussed above, illustrates a centrifugal chiller plant in which multiple chiller units ($CC_1$ 202 through $CC_r$, 203) are connected in parallel. For centrifugal chillers connected in parallel, the number of chiller/condenser water pumps may be equal to the number of chillers. For such an arrangement, in addition to the constraints described above, the following equations may be used to account for the parallel configuration:

$$m_{chw} = \sum_{i=1}^{n} \delta_{CC_i} m_{chwp_i} \quad (19)$$

$$T_{chwr} = T_{chwr_i}, 1 \leq i \leq n$$

$$T_{chws} = \frac{1}{m_{chw}} \sum_{i=1}^{n} \delta_{CC_i} m_{chwp_i} T_{chws_i}$$

Figure 3:
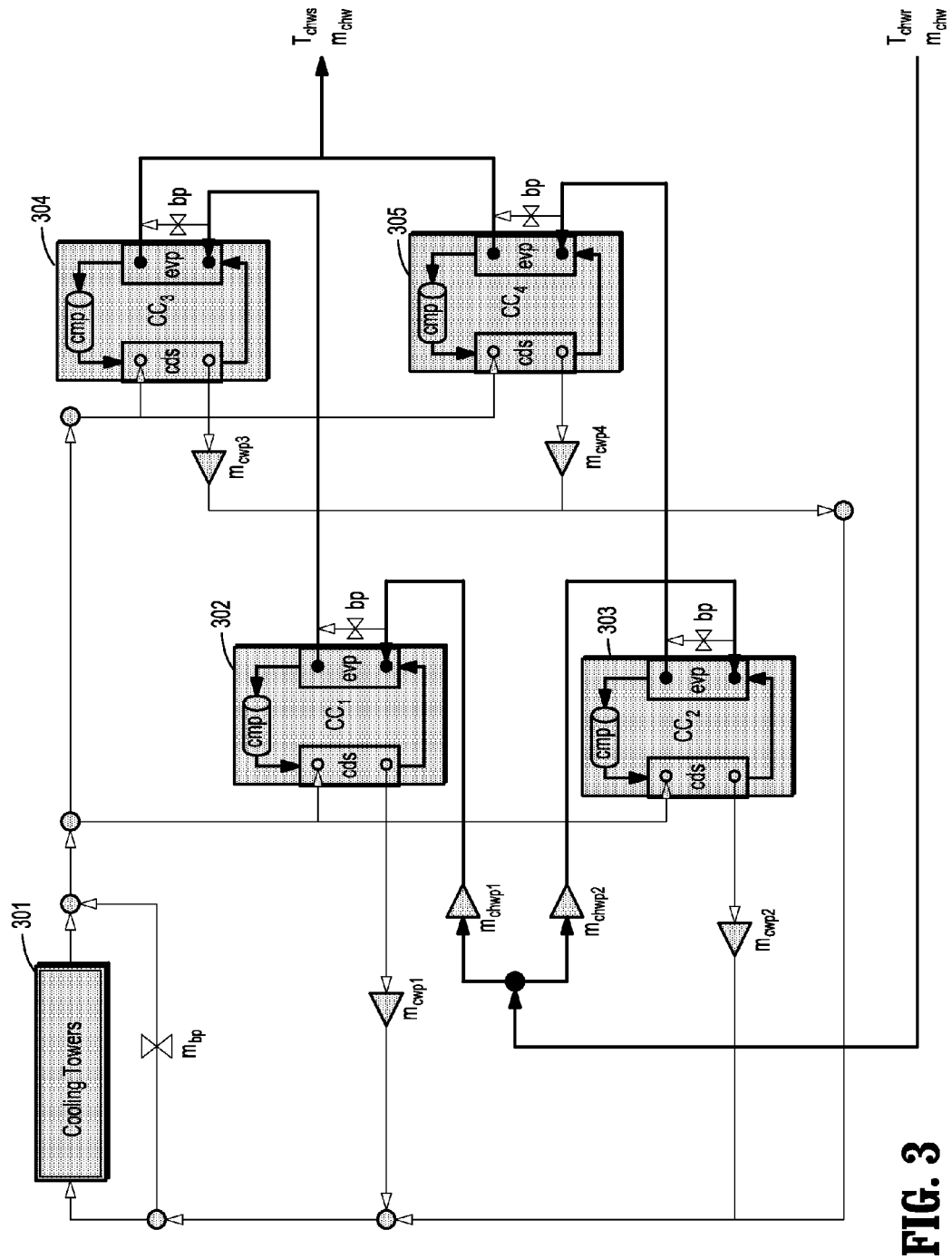
FIG. 3 is a schematic diagram illustrating multiple centrifugal chillers having a composite connection according to an exemplary embodiment of the present invention.

Exemplary embodiments may also utilize multiple instances of similar equipment connected in a composite fashion. FIG. 3 is a schematic diagram illustrating multiple centrifugal chillers having a composite connection according to an exemplary embodiment of the present invention. Here the chillers and pumps utilize composite connections. For composite connections, it may be assumed that there are h parallel branches with n=2h chillers. Thus, there may be an even number of chillers with half as many branches as chillers. It may also be assumed that each branch includes two chillers of approximately equal size, connected in series, denoted as $CC_i$ and $CC_{h+i}$ for any i∈1, ..., h. In FIG. 3, a cooling tower 301 is connected to four chillers $CC_1$ 302, $CC_2$ 303, $CC_3$ 304, and $CC_4$ 305 wherein a first branch including $CC_1$ 302 and $CC_2$ 303 are connected in series as well as a second branch including $CC_3$ 304 and $CC_4$ 305 that are also connected in series with respect to each other, with the first branch and the second branch connected in parallel.

Here, it can be seen that there are 2h condenser water loops and only h chilled water loops, and accordingly, 2h condenser water pumps and h chilled water pumps may be required. For the purposes of using a consistent notation, it may be assumed that there are another h imaginary chilled water pumps adhering to the following formula:

$$P_{chwp_{h+1}} = P_{chwp_{h+2}} = \ldots = P_{chwp_{2h}} = 0 \quad (20)$$

Additionally, the following equations from equations (19) above may still be applicable:

$$m_{chw} = \sum_{i=1}^{h} \delta_{CC_i} m_{chwp_i} \text{ and} \quad (21)$$

$$T_{chws} = \frac{\sum_{i=1}^{h} \delta_{CC_i} m_{chwp_i} T_{chws_{h+i}}}{m_{chw}}$$

and for all i=1, ..., h, the following may be applied:

$$\delta_{CC_i} \geq \delta_{CC_{h+i}}$$

$$m_{chwp_i} = m_{chwp_{h+i}}$$

$$T_{chwr_i} = T_{chwr_i}$$

$$T_{chws_i} = T_{chwr_{h+i}} \quad (22)$$

According to design and operation conditions of chillers connected in series, a bypass may be required on the evaporator of each chiller. For each branch, the bypass may be used to ensure that, when a first chiller of a branch is turned of and the other chiller of the branch is turned on, the chilled water loop can continue to flow through. Such a bypass may be binary and may either be switched on or off when the corresponding chiller is switched off or on, respectively. Accordingly, exemplary embodiments of the present invention may consider the operation of bypasses, as necessary, in performing optimization.

Returning to the model discussed above with respect to FIG. 1, the following equalities may be arrived at:

$$L_{CC} = \sum_{1}^{n} \delta_{CC_i} L_{CC_i} \quad (23)$$

$$P_{CC} = \sum_{i=1}^{n_{twr}} \delta_{CT_i} P_{twr_i} + \sum_{i=1}^{n} \delta_{CC_i} (P_{comp_i} + P_{chwp_i} + P_{cwp_i})$$

Figure 4:
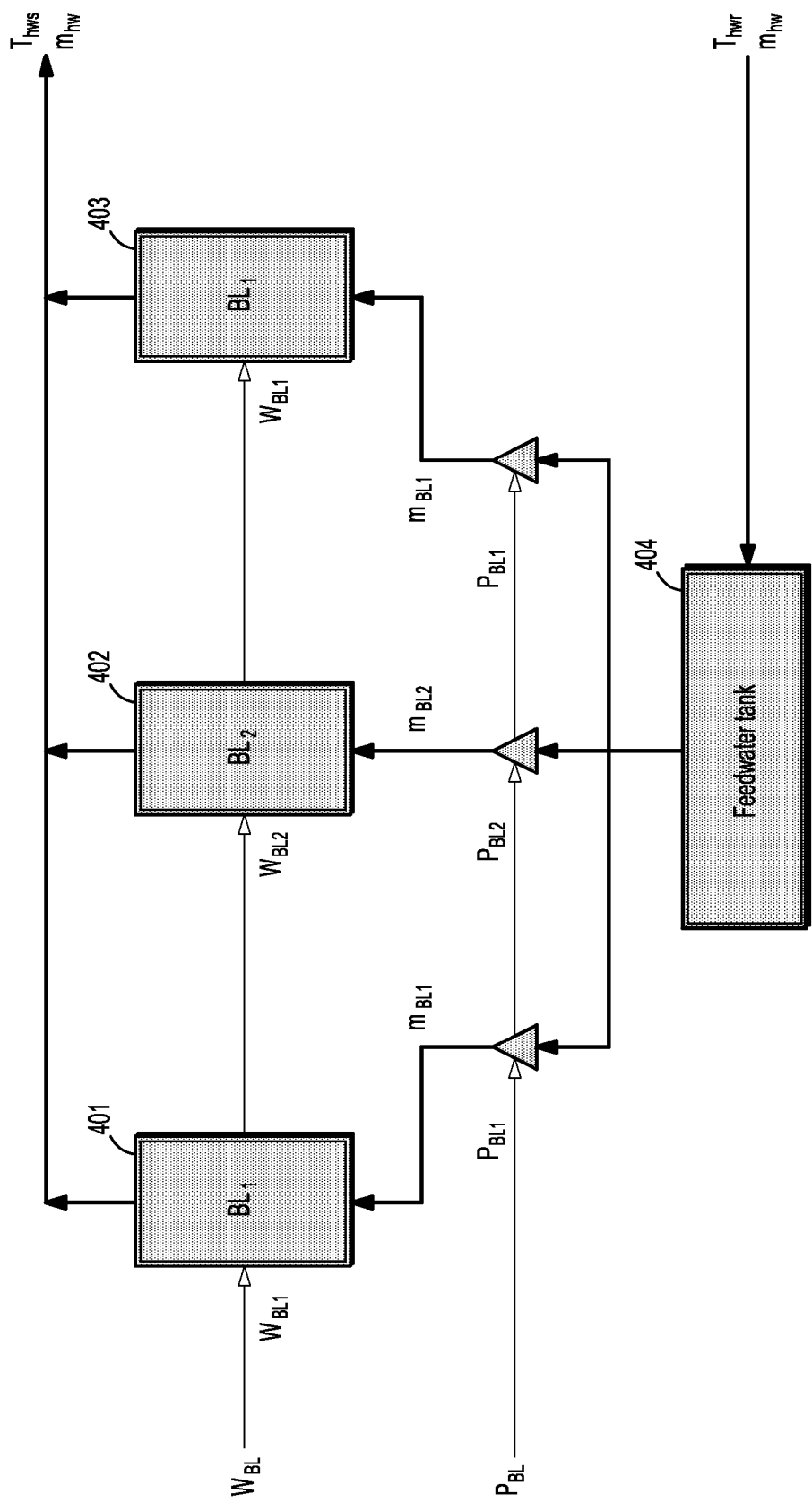
FIG. 4 is a schematic diagram illustrating an arrangement of multiple boilers for optimization in accordance with exemplary embodiments of the present invention.

In addition to chillers, other energy devices may be used. For example, exemplary embodiments of the present invention may optimize a plant including one or more boilers. As described herein, boilers may be enumerated as $BL_i$, where i=1, ..., l. Fuel consumption may be represented as $W_{BL-i}$. It may be assumed that each boiler is independently fed by one pump and that the boilers are arranged in parallel. FIG. 4 is a schematic diagram illustrating an arrangement of multiple boilers for optimization in accordance with exemplary embodiments of the present invention. Here, multiple boilers may be enumerated as $BL_1$ 401, $BL_2$ 402, ... $BL_l$ 403. There may be a single feedwater tank 104 supplying water to each boiler. Notation used herein in describing the boiler configuration may include:

α: partial load design factor;
$m_{BL-i}$: hot water flow rate in the i-th boiler;
$T_{hwr}$: hot water return temperature;
$T_{hws-i}$: hot water supply temperature of the i-th boiler;
$m_{BL-i,des}$: design hot water flow rate in the i-th boiler;
$W_{BL-i}$: design fuel consumption of the i-th boiler;
K, K': regression constants specific to each boiler.

For the boiler case described above, power and fuel consumption equations may be determined, for example, as:

$$P_{BL_i} = K_{PBL_i}(T_{hwr} - T_{hws_i})^{-3}$$

$$W_{BL_i} = K_{WBL_i}(T_{hwr} - T_{hws_i})^{-3} \quad (24)$$

Next, electrical power and gas consumption may be balanced along with flow and temperature:

$$P_{BL} = \sum_{i=1}^{l} \delta_{BL_i} P_{BL_i} \quad (25)$$

$$W_{BL} = \sum_{i=1}^{l} \delta_{BL_i} W_{BL_i}$$

$$m_{BL} = \sum_{i=1}^{l} \delta_{BL_i} m_{BL_i}$$

$$T_{hws} = \frac{1}{m_{BL}} \sum_{i=1}^{l} \delta_{BL_i} T_{hws_i} m_{BL_i}$$

For example, the following bounds may be applied:

$$\alpha_{m_{BL_i}} m_{BL_{i,des}} \leq m_{BL_i} \leq m_{BL_{i,des}} \quad (26)$$

$$\alpha_{W_{BL_i}} W_{BL_{i,des}} \leq W_{BL_i} \leq W_{BL_{i,des}}$$

While exemplary embodiments of the present invention may divide the complete set of energy devices into one or more groupings, for example, based on function, such as the cooling plant grouping and the heating plant grouping discussed above, the complete schedule may incorporate these distinct groupings into a single optimization plan. For example, the cooling plant and heating plant discussed above may be connected by the following equality:

$$S_{BL} = \sum_{i=1}^{l} \delta_{BL_i} K_{BL_i} m_{BL_i} (T_{hws_i} - T_{hwr}) \quad (27)$$

Another functional grouping that may be optimizes is the air handling unit. Air handling units may be used to dissipate in the building the hot or chilled water load generated by the power plant in the form of hot or cold air. Thus, for each zone or temperature set point i=1, ..., p, there exists an air handling unit. Such equipment may include a coil and a fan. The coil may circulate the hot or chilled water while fan may blow air through the coil. This heat exchange may cause the air to get heated or chilled, while causing the water to get chilled or heated. Thus, one may control either the water flow rate inside the coil (by a valve) or the air flow rate through this coil (by the fan), and it is this tradeoff that may be optimized in accordance with exemplary embodiments of the present invention.

Figure 5:
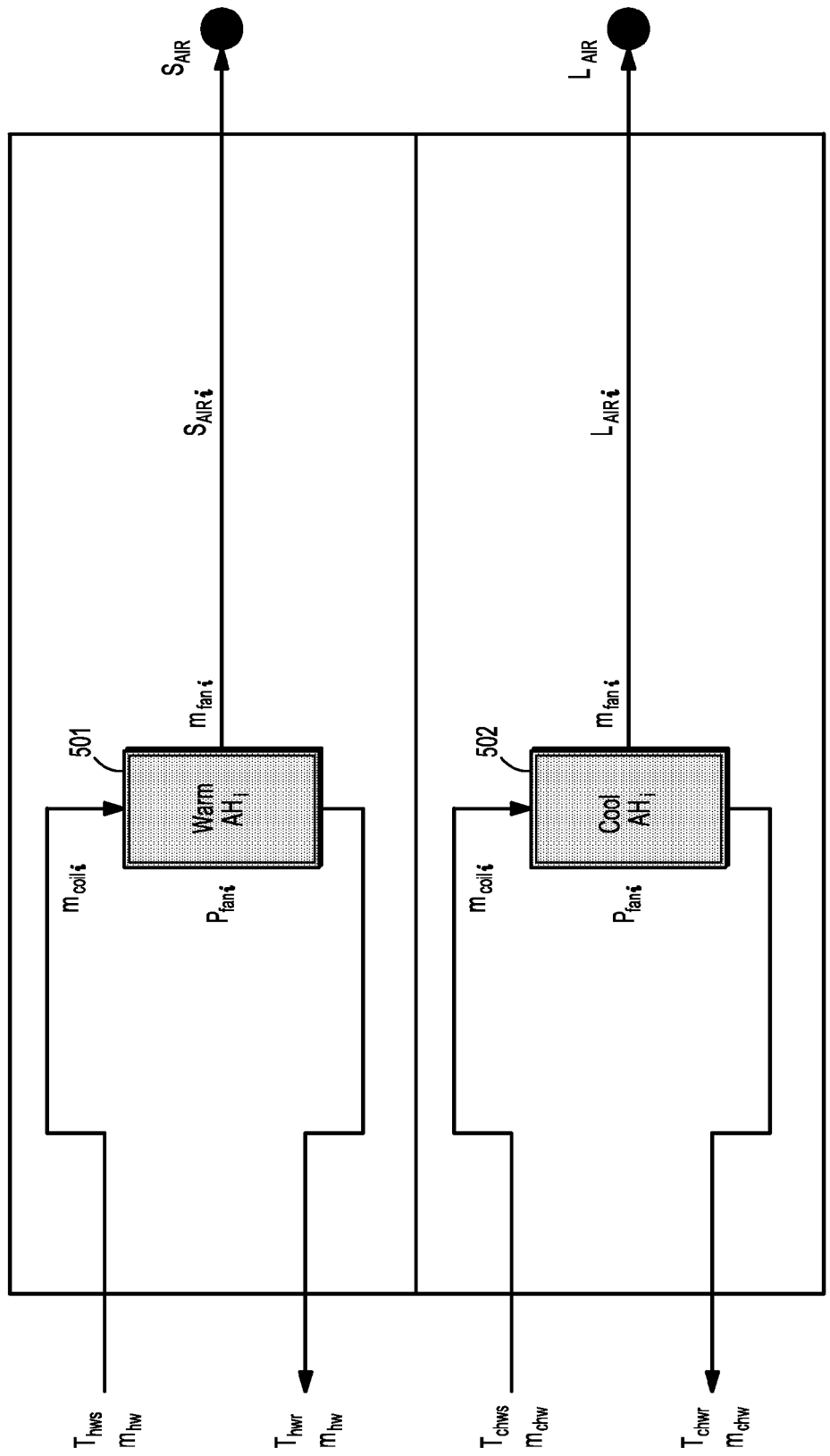
FIG. 5 is a schematic diagram illustrating a general scheme of an air handling unit in accordance with an exemplary embodiment of the present invention.

As air handling units dissipate the thermal load during winter and cooling load during summer, air handling units may be shared with both the cooling and heating systems. To simplify this relationship, it may be assumed that the fan coil is dry. FIG. 5 is a schematic diagram illustrating a general scheme of an air handling unit in accordance with an exemplary embodiment of the present invention. This air handling unit may include an air heating unit 501, which may be, for example, a heating plant as described in detail above, and an air cooling unit 502, which may be, for example, a cooling plant as described in detail above.

The following notation may be adopted:

$Q_{AIR}$: input load to be satisfied by the i-th air handling unit;
$m_{coil-i}$: water flow rate in the i-th air handling unit;
$m_{fan-i}$: air flow rate in the i-th air handling unit;
$m_{coil-i,des}$: design water flow rate of the i-th air handling unit;
$m_{fan-i,des}$: design air flow rate of the i-th air handling unit;
$T_{air}$: air temperature supplied by air handling units at current stage;
$T_{coils-i}$: entering water temperature in the i-th air handling unit;
$T_{coilr-i}$: leaving water temperature in the i-th air handling unit;
$\Delta T_{coil-i}$: difference between entering water temperature and leaving water temperature in the i-th air handling unit;
$P_{fan-i}$: power developed by the i-th air handling unit;
$P_{fan-i,des}$: design power developed by the i-th air handling unit.

The following equations, valid for all i=1, ..., p, may represent the load requirement, power consumption, and balance, respectively. It should be noted that $Q_{AIR-i}$ may be equal to either $L_{AIR-i}$ or $S_{Air-i}$ of FIG. 1.

$$\Delta T_{coil_i} = T_{coilr_i} - T_{coils_i} \quad (28)$$

$$Q_{WATER_i} = \delta_{AH_i} c_{p,w} m_{coil_i} \Delta T_{coil_i}$$

$$Q_{AIR_i} = \delta_{AH_i} c_{p,m} m_{fan_i} (T_{air} - T_{coils_i})$$

$$Q_{WATER_i} = Q_{AIR_i}$$

$$P_{fan_i} = P_{fan_i,des} \left( \frac{m_{fan_i}}{m_{fan_i,des}} \right)^3$$

The following bounds may apply for all i:

$$\alpha_{m_{fan_i}} m_{fan_i,des} \leq m_{fan_i} \leq m_{fan_i,des} \quad (29)$$

$$\alpha_{m_{coil_i}} m_{coil_i,des} \leq m_{coil_i} \leq m_{coil_i,des}$$

The air handling unit described here may be added to the model described above including the heating and cooling plants, for example, with the following equations:

$$m_{chw} = \sum_{i=1}^{p} m_{coil_i} \quad (30)$$

$$T_{chwr} = \frac{1}{m_{chw}} \sum_{i=1}^{p} T_{coilr_i} m_{coil_i}$$

$$T_{chws} = T_{coils_i} \text{ and}$$

$$P_{AH} = \sum_{i=1}^{p} \delta_{AH_i} P_{fan_i}$$

These equations may operate under the assumption that losses of heating and cooling do not occur within the ducts. While this may be a fair assumption, other assumptions may be made and/or loss of heating and cooling within the ducts may be accounted for by modification to the formulas presented above.

In addition to the energy devices described above, other components may be accounted for and optimized in accordance with exemplary embodiments of the present invention. From the optimization model and the subsequent derivations, the following input-output relations may be used:

Amount of gas required by the co-generator to produce $S_{COG}^k$ units of steam and $P_{COG}^k$ units of electricity: $W_{COG}^k(S_{COG}^k, P_{COG}^k)$;

Amount of steam required by the absorption chiller i to produce $L_{AC-i}^k$ units of cooling load: $S_{AC-i}^k(L_{AC-i}^k)$;

Amount of gas required by the gas-fired absorption chiller i to produce $K_{GC-i}^k$ units of cooling load: $W_{GC-i}(L_{GC-i}^k)$;

Amount of electricity produced by solar cell under the solar intensity $I^k$: $P_{SCE}(I^k)$;

Amount of hot water produced by solar collector under the solar intensity $I^k$: $S_{SCO}(I^k)$;

Amount of electricity required by the geothermal system to produce $L_{GTS}^k$ of cooling load: $P_{GTS}L_{GTS}^k$.

Exemplary embodiments of the present invention may obtain the above relations in at least two possible different ways. According to a physical description approach, the relations may be obtained by an understanding the internals of each component (for example, chillers, boilers, and the co-generation unit). The set of equations governing the input-output relations above may be found.

Accordingly, exemplary embodiments of the present invention may provide a framework for total plant energy optimization. This framework may utilize a two-tiered modeling structure that at a first tier established a master model for characterizing a whole building as a network of sub-plants while at a second tier establishes sub-models for each sub-plant. This two-tiered solution allows for the simplified characterization of sub-plants as "gray box" models at the master-model level. At this level, each sub-plant may be characterized by a corresponding sub-model and a network of equations may be used to link the various sub-models as a graph where each node is a sub-model and each edge is represented as the interplay between the connected sub-models. At the master-model level, external operational inputs may also be considered. These inputs may be specified, for example, in terms of total energy demand and system initial inertia states.

Examples of suitable sub-plants that may be modeled using corresponding sub-models may include the heating plant, cooling plant, and air handling structure described in detail above. However, any collection of energy units may be grouped as a sub-plant, particularly where the grouped devices operate together for a common purpose, such as heating or cooling.

At the second tier, each sub-model may be expressed as a graph of interconnected energy devices where each node may represent a single energy device and each edge represents interaction between energy devices. For example, where the sub-plant is a centrifugal chiller plant, such as seen in FIG. 2, nodes may include chillers, pumps, and cooling towers.

At this level, real-world parameters and performance functions may be used to represent the function of each constituent energy device. The interaction between these devices may be represented as network equations for each edge of the sub-model's graph. These network equations may represent, for example, fundamental physical relationships between the units, such as, for example, mass and energy balances, etc.

Statistical estimation procedures may be used to represent various aspects of the parameters that are estimated from sample performance data. Operational inputs may be specified in terms of the electrical load dispatched to the particular energy device and the unit commitment schedule that may be assigned to key unit blocks of the sub-plant.

This two-tiered approach may also be characterized by mutual hierarchical connections between the first and second tier. For example, each gray-box representation of a sub-plant in the master-model at tier 1 may have a corresponding sub-model at tier 2 that characterizes the operation of the sub-plant in more detail. The electrical load and unit commitment schedule results from the master model's execution may be propagated to each sub-model as the operational input. The parameters for each gray-box representation of the sub-plants may be calibrated, for example, based on a sequence of runs of the corresponding sub-models for a variable operational input.

Accordingly, exemplary embodiments of the present invention may optimize first at the sub-model tier and then for the master model tier. Exemplary optimization techniques may first produce appropriate mathematical programming representations of the Master-Model & all Sub-Models by reformulating and approximating functional relations in those models such that the resulting Mathematical Programs are solvable by Optimization Solvers (for example, Mixed-Integer Linear Programs).

Figure 6:
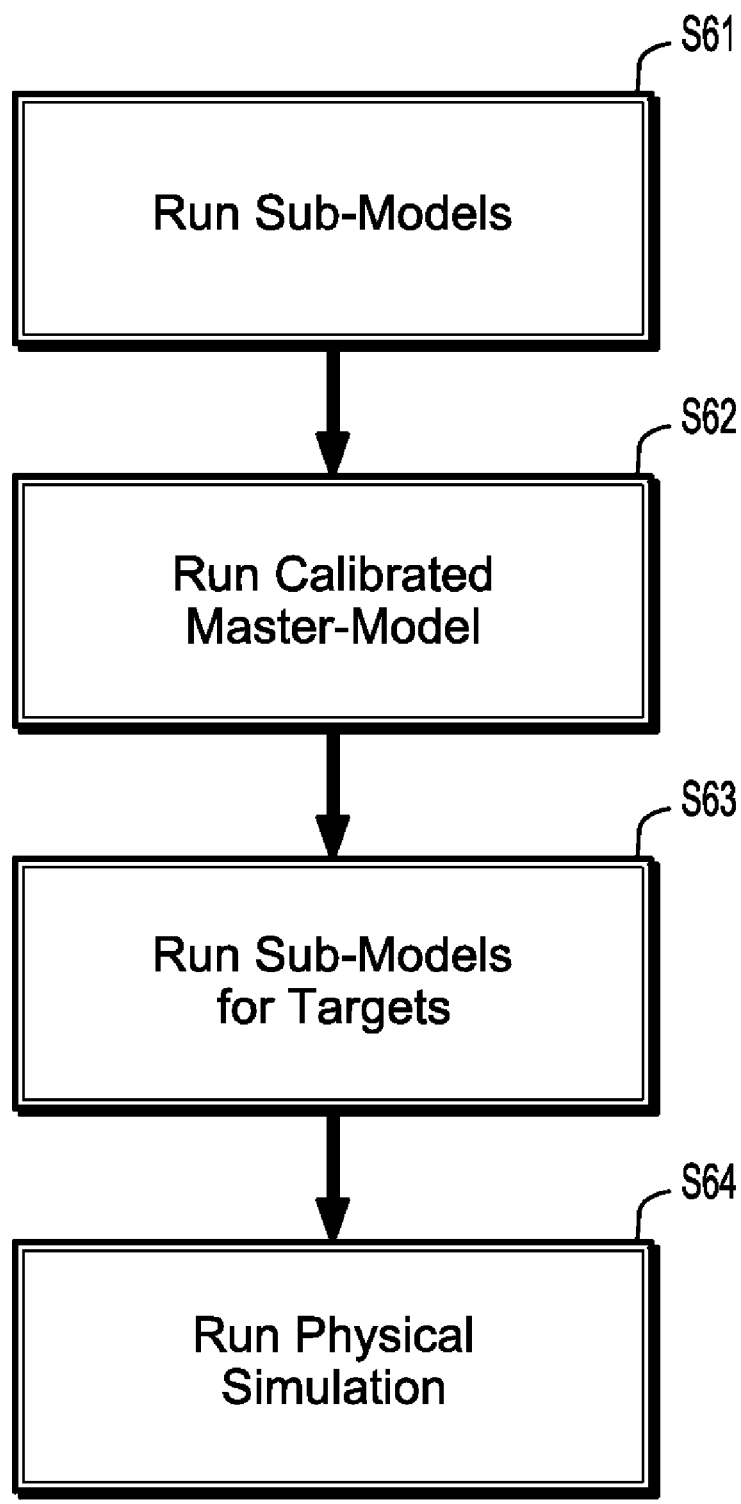
FIG. 6 is a flow chart illustrating a process for optimizing operational control of a plant according to an exemplary embodiment of the present invention.

Each Mathematical Program may then be sequentially solved via running the appropriate Optimization Solver and the resulting operational control performance statistics may be obtained according to the workflow proscribed below:

FIG. 6 is a flow chart illustrating a process for optimizing operational control of a plant according to an exemplary embodiment of the present invention. First, a plurality of sub-models may be run for a variety of operational inputs to calibrate the gray-boxes of the master-model (Step S61). Then, the calibrated master model may be run (Step S62). Next, each sub-model may be run for energy demands and scheduling targets produced by the master model (Step S63). Then, a physical simulation may be run that uses, in a control loop, set points produced by the sub-models (Step S64).

Accordingly, exemplary embodiments of the present invention seek to optimize operational efficiency of large-scale industrial and/or commercial facilities including, but not limited to, controlling the operation of heating units, cooling units and air handling units. These, and other units, are referred to herein as energy devices as they may utilize energy, generate energy and/or store energy. This process may be embodied, for example, as a computer program executed on a computer system. There may be one of two outputs of this program. The first possible output may be a time-based schedule that lays out the operational settings for a plurality of energy devices. The operational settings may include when to activate a device, when to deactivate a device, and what setting to operate the device at.

In addition to, or instead of, providing the time-based schedule, exemplary embodiments of the present invention may provide as output, real-time control of the operational settings for the plurality of energy devices. Thus, the computer software contemplated herein may either be used to plan for the operation or control the operation of a system of interrelated energy devices.

Figure 7:
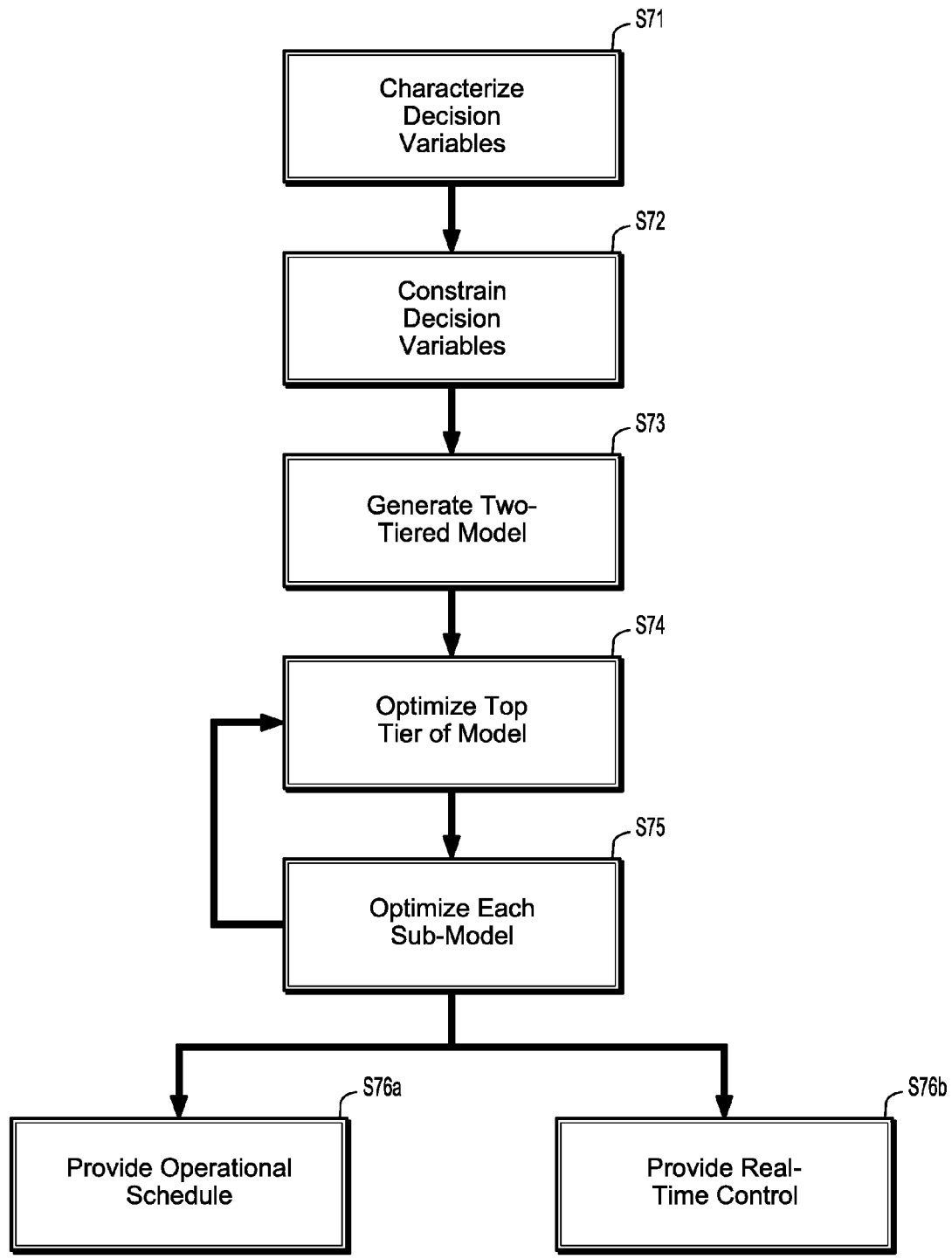
FIG. 7 is a flow chart illustrating an approach for optimizing operational settings for a plurality of energy devices according to an exemplary embodiment of the present invention.

As discussed above, exemplary embodiments of the present invention seek to create this output by solving an optimization problem concerning the system of interrelated energy devices. FIG. 7 is a flow chart illustrating an approach for optimizing operational settings for a plurality of energy devices according to an exemplary embodiment of the present invention. The first step is to characterize a set of decision variables representing each aspect of the plant system (Step S71). This process is described in detail above with respect to FIGS. 1-5. These variables may be derived either from the manufacturer's specifications for each energy device or may be derived experimentally or through the use of a computer simulation.

Next, the decision variables may be constrained though a system of equations that represent the interrelations between the energy devices, related hardware, operational conditions, etc. and also constrain the variables in accordance with the physical limitations of the devices and other hardware (Step S72).

Next, a two-tiered model may be generated for the plurality of energy devices (Step S73). The two-tiered model may include, at a top level, described above as a "master model." The master model may be expressed, for example, as a graph having a plurality of nodes that represent sub-grouping of energy devices and/or utility sources and ambient conditions and a plurality of edges that interconnect the nodes, each edge setting forth the operational relationship between the sub-groupings connected by the corresponding edges. At the top level, each sub-grouping is treated as a "gray box." As black box is understood to be a device for which the inner workings are completely unknown but the relationship between inputs and outputs is understood, a "gray box," therefore, is a device for which only limited information is known about the inner workings and the relationship between inputs and outputs is known. Thus, a gray box, as used herein, is a model for a sub-system for which some information about its operation is known and relied upon in addition to its relationship between inputs and outputs.

Here, each sub-grouping is understood as a gray box because its general purpose is understood, for example, a sub-grouping may be a cluster of heating units connected in parallel. However, from the point of view of the top level model, the sub-grouping is understood primarily in terms of the relationship between inputs and outputs.

At the bottom level, described above as "sub-models" however, each sub-grouping is modeled in detail, for example, taking into account each energy device and related devices such as pumps and the like. By generating this two-tiered model, exemplary embodiments of the present invention may perform optimization in two parts, first with respect to the top level, and then with respect to the bottom level.

Accordingly, the next step in the process is to optimize the model at the top tier where interactions between sub-groupings have been established (Step S74). Optimization may be based upon the constrained variables and equalities as described above. Optimization may be performed with the aid of an Optimization Solver. An Optimization Solver is a numeric algorithm prescribed to a given class of mathematical problems that are known as solvable. The Optimization Solver may solve general-case optimization problems with greater computational efficiency than exhaustive search approaches. The solution may be found, for example, as a combination of values for all decision variables that satisfies all constraints and optimizes the objective function of the problem.

After the master model has been optimized, each sub-model may be optimized (Step S75). Optimization of each sub-model may be performed, for example, using the Optimization Solver but constrained by the output requirements established from the step of optimizing the master model.

After optimization of the sub-models has been performed, there may optionally be an iterative improvement of the optimization of the master model based on the optimization of the sub-models, and thereafter, the optimization of the sub-models may be improved based on the improved optimization of the master model. This iterative loop may be repeated, for example, for a desired number of iterations, or until subsequent iterations no longer result in improvements.

Output of this process may be in the form of either an operational schedule (Step S76a) or as real-time control (Step S76b). Where an operational schedule is provided, the operational schedule may dictate the operation of the various energy devices and related hardware including, for example, activation times, deactivation times, and where appropriate, a power level or other operational details. The provided operational schedule may then be implemented either manually or with the assistance of automation software.

Where real-time control is provided, the optimization procedure may be automatically implemented by the direct control of the software executing the above-described procedure. Moreover, optimization may run continuously or periodically, making use of new input parameters and/or data obtained from the actual operation of the plant/building such that as parameters vary from the pre-determined or idealized fashion, these parameters may be updated to reflect actual performance.

Exemplary embodiments of the present invention may employ mixed integer-linear programming in optimizing the model. For example, the problem may be defined as follows:

$$\min \sum_{t=1}^{T} \sum_{j \in V(G)} Z_t^j$$

$$Z_t^j = \sum_{k=1}^{K^j} C_{t,in}^{j,k} \cdot X_{in,t}^{j,k} + C_{t,out}^{j,k} \cdot X_{t,out}^{j,k} + C_{t,st}^{j,k} \cdot Y_t^{j,k}$$

$$\sum_{k=1}^{K^j} A_{in}^{j,k} \cdot X_{in,t}^{j,k} + A_{out}^{j,k} \cdot X_{out,t}^{j,k} + B_{-1}^{j,k} \cdot Y_{t-1}^{j,k} + B_0^{j,k} \cdot Y_t^{j,k} \in [\underline{b}_t^j; \overline{b}_t^j]$$

$$\sum_{e \in p} \begin{bmatrix} Q_{head,t}^e \sum_{\substack{k=1 \\ i \in h(e) \\ x \in I(e)}}^{K^i} X_{out,t}^{i,k,x} + T_{head,t}^e \sum_{\substack{k=1 \\ i \in h(e) \\ y \in S_{head}(e)}}^{K^j} Y_t^{j,k,y} + \\ Q_{tail,t}^e \sum_{\substack{k=1 \\ j \in t(e) \\ x \in O(e)}}^{K^i} X_{in,t}^{j,k,x} + T_{tail,t}^e \sum_{\substack{k=1 \\ j \in t(e) \\ y \in S_{tail}(e)}}^{K^j} Y_t^{j,k,y} + U_t^e \end{bmatrix} \in [\underline{r}_t^p; \overline{r}_t^p]$$

$$w_t^{j,k} \cdot m_{in}^{j,k,x} \le X_{in,t}^{j,k,x} \le -w_t^{j,k} \cdot M_{in}^{j,k,x}$$

$$w_t^{j,k} \cdot m_{out}^{j,k,x} \le X_{out,t}^{j,k,x} \le -w_t^{j,k} \cdot M_{out}^{j,k,x}$$

-continued $$w_t^{j,k} \cdot m_{st}^{j,k,y} \le Y_t^{j,k,y} \le -w_t^{j,k} \cdot M_{st}^{j,k,y}$$

$$\sum_{k=1}^{K^j} \Gamma_1^{j,k} w_t^{j,k} + \sum_{n \in N^f} \Lambda_1^{j,n} \delta_{n,t}^j \in [\underline{l}_{1,t}^{j,n}; \overline{l}_{1,t}^{j,n}], \forall f \in F^j \subset N^j$$

$$\sum_{n=1}^{N^j} \Lambda_2^{j,n} \delta_{n,t}^j + \sum_{k \in K^g} \Gamma_2^{j,k} w_t^{j,k} \in [\underline{l}_{2,t}^{j,k}; \overline{l}_{2,t}^{j,k}], \forall g \in G^j \subset K^j$$

$$\sum_{u=0}^{T_n^j} \Delta_u^1 \delta_{n,t-u}^j \in [\underline{d}_{1,t}^{j,n}; \overline{d}_{1,t}^{j,n}]$$

$$\sum_{u=0}^{T_k^j} \Delta_u^2 w_{t-u}^{j,k} \in [\underline{d}_{2,t}^{j,k}; \overline{d}_{2,t}^{j,k}]$$

This problem may be solved, for example, using an MILP solver.

Figure 8:
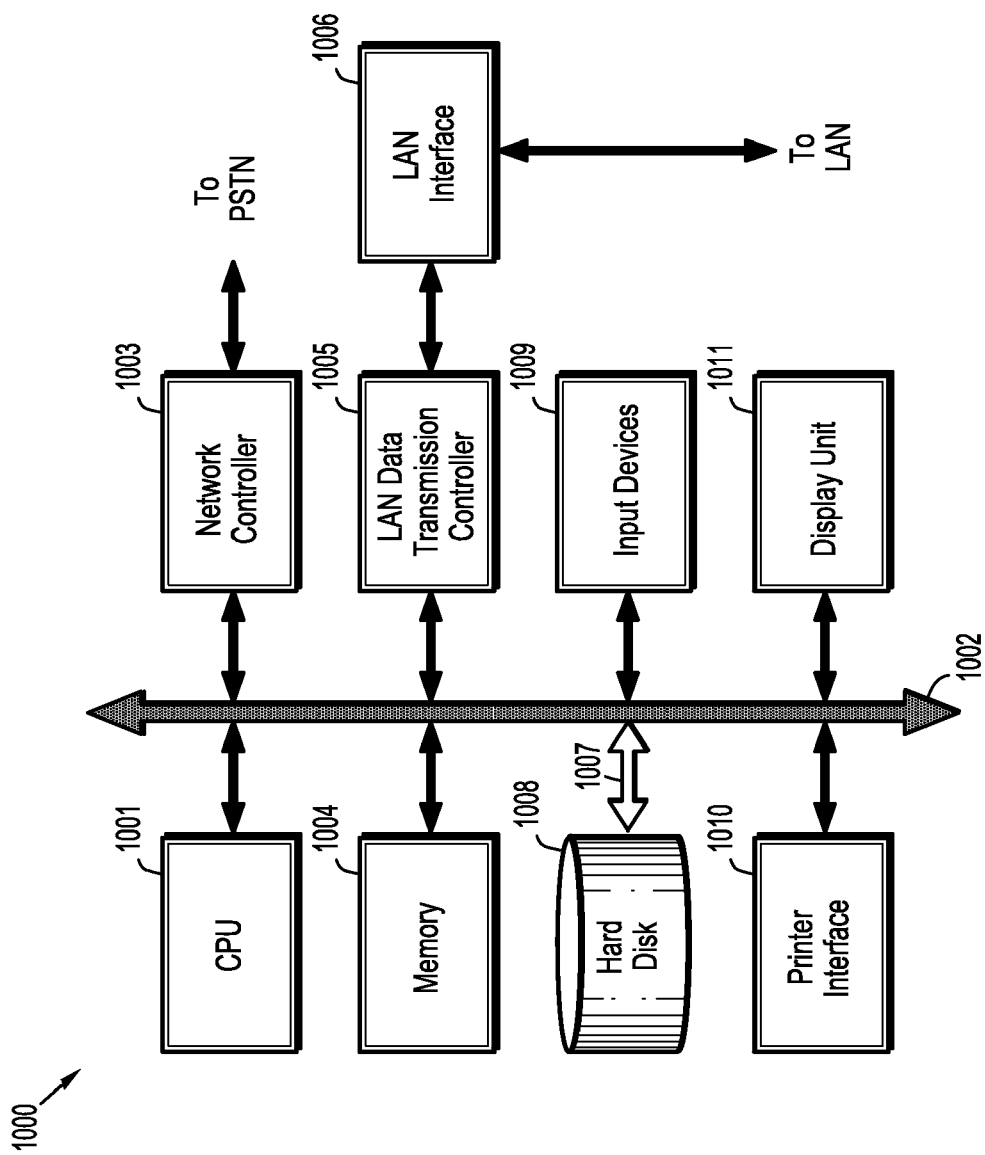
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for optimizing operational settings for a plurality of energy devices, comprising:
   representing each of the plurality of energy devices in terms of a set of decision variables and operational parameters;
   constraining the decision variables and operational parameters based on operational conditions and interrelationship between the plurality of energy devices;
   generating a two-tiered model of the plurality of energy devices wherein a top tier of the model represents interaction of various sub-models and a bottom tier of the model includes a set of the sub-models that form the top tier, each sub-model representing detailed operation of some of the plurality of energy devices and their interaction; and
   optimizing the two-tiered model to provide either a schedule of operation for the plurality of energy devices or real-time control for the plurality of energy devices,
   performing each of the above steps within a computer system.

2. The method of claim 1, wherein the plurality of energy devices includes a sub-grouping of chiller units, a sub-grouping of heater units and an air handling device, each with a corresponding sub-model within the two-tiered model of the plurality of energy devices.

3. The method of claim 2, wherein the sub-grouping of heater units includes one or more boilers and a feedwater tank.

4. The method of claim 2, wherein the sub-grouping of cooling units includes one or more centrifugal chillers and a cooling tower.

5. The method of claim 1, wherein optimizing the two-tiered model is performed using mixed integer-linear programming.

6. The method of claim 1, wherein the step of optimizing the two-tiered model includes optimizing the top tier model and optimizing the bottom tier model iteratively.

7. The method of claim 1, wherein the step of generating the two-tiered model includes representing the plurality of energy devices as a graph having a plurality of nodes that represent the sub-models of energy devices, utility sources, or ambient conditions and a plurality of edges that interconnect the nodes, each edge setting forth an operational relationship between the sub-models connected by the corresponding edges.

8. The method of claim 1, wherein with respect to the top tier of the two-tiered model, each sub-model is treated as a gray box model and with respect to the bottom tier of the two-tiered model, each sub-model includes a detailed representation of the energy devices of that sub-model.

9. The method of claim 1, wherein the step of optimizing the two-tiered model is performed using an optimization solver based on mathematical programming.

10. The method of claim 1, wherein optimization of the two-tiered model provides a schedule of operation for the plurality of energy devices, dictating activation times, deactivation times or operational levels of the plurality of energy devices.

11. The method of claim 1, wherein optimization of the two-tiered model provides real-time control of the plurality of energy devices, controlling activation times, deactivation times or operational levels of the plurality of energy devices.

12. The method of claim 1, wherein the plurality of energy devices includes devices that utilize energy, devices that generate energy, or devices that store energy.

13. A computer system comprising:
a processor; and
a program storage device readable by the computer system, embodying a program of instructions executable by the processor to perform method steps for optimizing operational settings for a plurality of energy devices, the method comprising:
generating a model of the plurality of energy devices representing interaction of the energy devices with each other and operational variables; and
optimizing the model to provide either a schedule of operation for the plurality of energy devices or real-time control for the plurality of energy devices,
implementing the model as a two-tiered model in which the energy devices are organized into sub-groupings and interaction between each of the sub-groupings is represented at a top tier of the model and interaction between each of the energy devices within each sub-grouping are represented at a bottom tier of the model.

14. The computer system of claim 13, wherein each of the plurality of energy devices are represented in the model in terms of a set of decision variables and operational parameters.

15. The computer system of claim 13, wherein optimization of the model is performed using mixed integer-linear programming.

16. A computer system comprising:
a processor; and
a program storage device readable by the computer system, embodying a program of instructions executable by the processor to perform method steps for optimizing operational settings for a plurality of energy devices, the method comprising:
representing each of the plurality of energy devices in terms of a set of decision variables and operational parameters;
constraining the decision variables and operational parameters based on operational conditions and interrelationship between the plurality of energy devices;
generating a two-tiered model of the plurality of energy devices wherein a top tier of the model represents interaction of various sub-models and a bottom tier of the model includes a set of the sub-models that form the top tier, each sub-model representing detailed operation of some of the plurality of energy devices and their interaction;
optimizing the two-tiered model to provide either a schedule of operation for the plurality of energy devices or real-time control for the plurality of energy devices; and
implementing an optimization solver employing mixed integer-linear programming.

17. The computer system of claim 16, wherein generating the two-tiered model includes representing the plurality of energy devices as a graph having a plurality of nodes that represent the sub-models of energy devices, utility sources, or ambient conditions and a plurality of edges that interconnect the nodes, each edge setting forth an operational relationship between the sub-models connected by the corresponding edges.

18. The computer system of claim 16, wherein with respect to the top tier of the two-tiered model, each sub-model is treated as a gray box model and with respect to the bottom tier of the two-tiered model, each sub-model includes a detailed representation of the energy devices of that sub-model.

* * * * *